United States Patent [19]

Jolissaint

[11] Patent Number: 5,740,240
[45] Date of Patent: Apr. 14, 1998

[54] COMPUTER TELEPHONY INTEGRATION SYSTEM AND METHOD

[75] Inventor: Charles H. Jolissaint, Sunnyvale, Calif.

[73] Assignee: Edify Corporation, Santa Clara, Calif.

[21] Appl. No.: 528,893

[22] Filed: Sep. 15, 1995

Related U.S. Application Data

[63] Continuation-in-part of Ser. No. 419,103, Apr. 10, 1995.

[51] Int. Cl.$^6$ ................................................. H04M 3/50
[52] U.S. Cl. ............................ 379/265; 379/266; 379/88
[58] Field of Search ............................... 379/265, 266, 379/142, 127, 67, 88, 89

[56] References Cited

U.S. PATENT DOCUMENTS

| | | | |
|---|---|---|---|
| 4,805,209 | 2/1989 | Baker, Jr. et al. | 379/96 |
| 4,942,602 | 7/1990 | Baker, Jr. et al. | 379/212 |
| 4,943,996 | 7/1990 | Baker, Jr. et al. | 379/96 |
| 4,949,373 | 8/1990 | Baker, Jr. et al. | 379/96 |
| 4,955,047 | 9/1990 | Morganstein et al. | 379/112 |
| 4,975,941 | 12/1990 | Morganstein et al. | 379/88 |
| 5,020,095 | 5/1991 | Morganstein et al. | 379/67 |
| 5,029,196 | 7/1991 | Morganstein | 379/67 |
| 5,046,088 | 9/1991 | Margulies | 379/211 |
| 5,097,528 | 3/1992 | Gursahaney et al. | 379/67 |
| 5,109,405 | 4/1992 | Morganstein | 379/89 |
| 5,303,298 | 4/1994 | Morganstein et al. | 379/67 |
| 5,309,504 | 5/1994 | Morganstein | 379/67 |
| 5,347,574 | 9/1994 | Morganstein | 379/210 |
| 5,452,350 | 9/1995 | Reynolds et al. | 379/265 |
| 5,528,678 | 6/1996 | Kaplan | 379/201 |

FOREIGN PATENT DOCUMENTS

| | | | |
|---|---|---|---|
| 0375119 A2 | 6/1990 | European Pat. Off. | H04Q 3/00 |
| 0545226 A2 | 6/1993 | European Pat. Off. | H04M 3/50 |
| 2273853 | 6/1994 | United Kingdom | H04M 3/42 |
| WO 88/0296 | 4/1988 | WIPO | H04M 3/50 |

OTHER PUBLICATIONS

Hassler, Kerry W., et al., "Revolutionizing Definity Call Centers in the 1990s", AT&T Technical Journal, vol. 74, No. 4, Jul./Aug. 1995, pp. 64–73.

*Primary Examiner*—Ahmad F. Matar
*Attorney, Agent, or Firm*—Fenwick & West LLP

[57] ABSTRACT

An automated telephone call response system and method are provided for routing data base information obtained in an automated telephone call response to a subsequently selected live agent. A voice response unit receives caller identification information from a caller, retrieves a record on the caller based on the identification information, provides information requested by caller, permits the caller to select a live agent, and provides the live agent number to determine the network identification number. Accordingly, the live agent receives data base information on a caller at the time the live agent begins conversation with the caller.

2 Claims, 11 Drawing Sheets

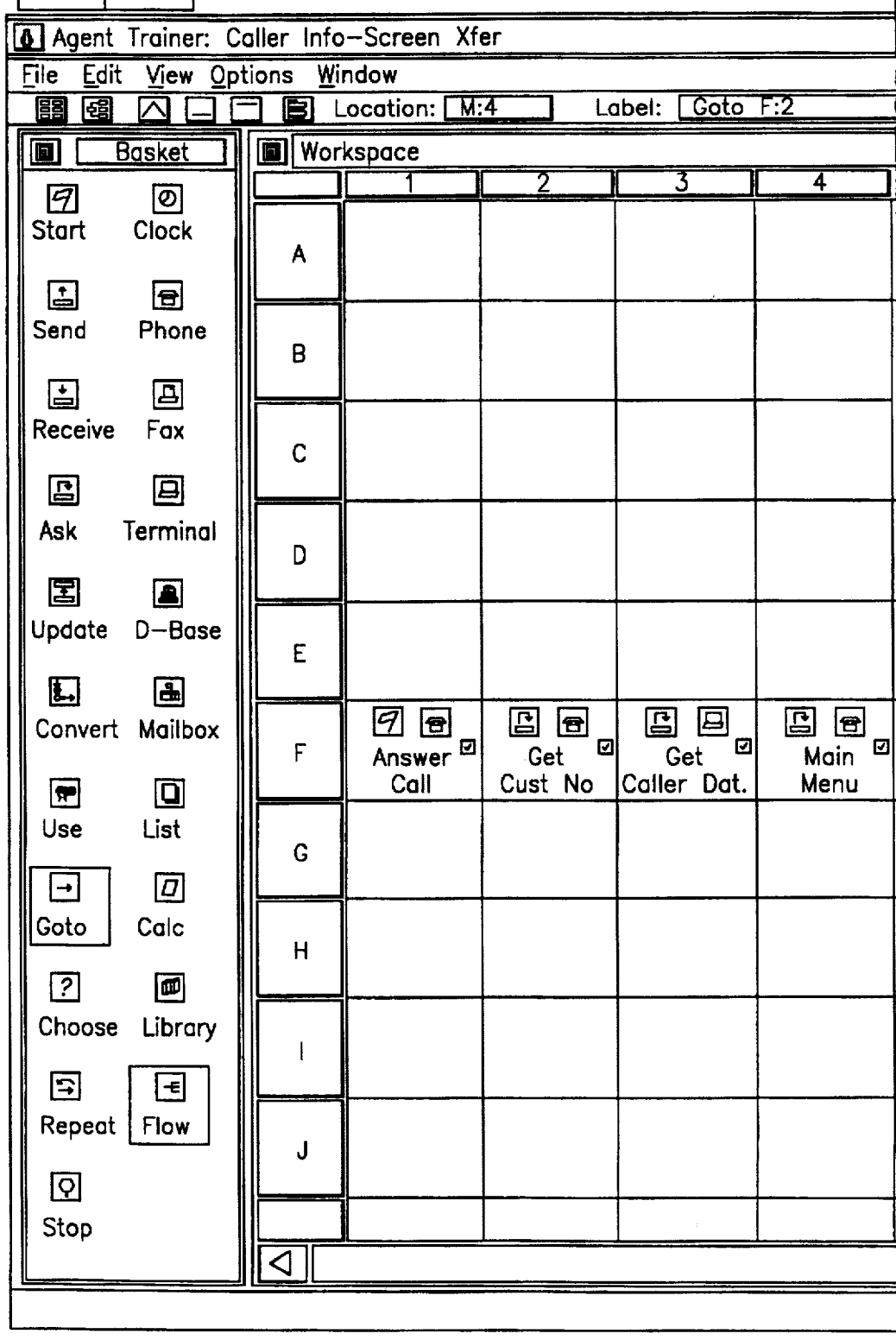

COMPUTER TELEPHONY INTEGRATION SYSTEM AND METHOD

TECHNICAL FIELD OF THE INVENTION

This application is a continuation-in-part application of U.S. patent application Ser. No. 08/419,103, filed Apr. 10, 1995 and having the title "Object Oriented Customer Information Exchange System and Method" which is hereby expressly referenced and incorporated herein by reference.

This application is further related to U.S. patent application Ser. No. 08/529,166, filed on even day herewith and having the title "Web Page Synchronization System and Method" which is hereby expressly referenced and incorporated herein by reference.

1. Technical Field of the Invention

This invention relates to systems and methods for computer telephony.

2. Background

Current computer telephone systems interact inefficiently with human agents. For example, according to one computer telephone system, when a user makes a call to the system, the system automatically answers and makes an automated request for user identification. The user then provides a dual tone multifrequency (DTMF) indication of identity. The system uses the identifying information to query a computer database for information about the user. Based upon the information provided in the database about use characteristics or preferences, the system requests election of a user-specific menu of service options, from which the user may chose a desired DTMF response. The options provided may be inadequate, and the user may wish to withdraw from the automated response mode of system operation, requesting instead intervention of a live agent or operator. If the user elects a live agent, a particular live agent must be selected. Further, the user information which has been found based upon the user identification made must either be reproduced again from the original data base or must be transmitted to the live agent to enable the agent to provide immediate assistance without having to repeat the entire user identification and data query operation which produced user specific information to service the particular call.

Currently available methods and systems for routing user information based upon an initial automated user identification to a subsequently determined live agent may be slow, cumbersome, and repetitive.

It is desirable to develop systems and methods of computer telephony integration which allow a telephony-based application to utilize a combination of switch-based and computer-based information sources to more efficiently process a telephone call.

SUMMARY OF THE INVENTION

According to the present invention, telephone calls are processed using switch and computer based information using a voice response unit (VRU) such as an electronic workforce, a switch such as a private branch exchange (PBX), a computer having a data base, and a live agent having direct access to a personal computer and a telephone.

According to the present invention, a software agent in the VRU performs intelligent call routing with information about a calling party provided to a live agent identified after the call has been received by the VRU and after the caller has made a request for a live agent.

According to the present invention, a software agent transfers a call to a live agent and accesses a caller's record so the live agent can answer the call in a more personal and efficient manner. Thus, a coordinated call and screen transfer operation, i.e., screen popping evolution, is accomplished with the caller identify being established once by the VRU without need for reascertainment by the live agent, because the information about caller identity is passed by network to the correct one of a number of live agents working a switch site.

According to the present invention, telephone calls are intelligently routed and transferred by a call center agent performing account handling activities, based upon Automatic Number Identification/Dialed Number Identification Service (ANI/DNIS) information. The software agent receiving the call obtains calling party information, permitting access to a local table, local or remote database information, or a host computer about the caller or number dialed to route the call to a specific live agent, live agent group, or particular electronic work force (EWF) job description.

DETAILED DESCRIPTION OF THE INVENTION

Figures 2, 2A:
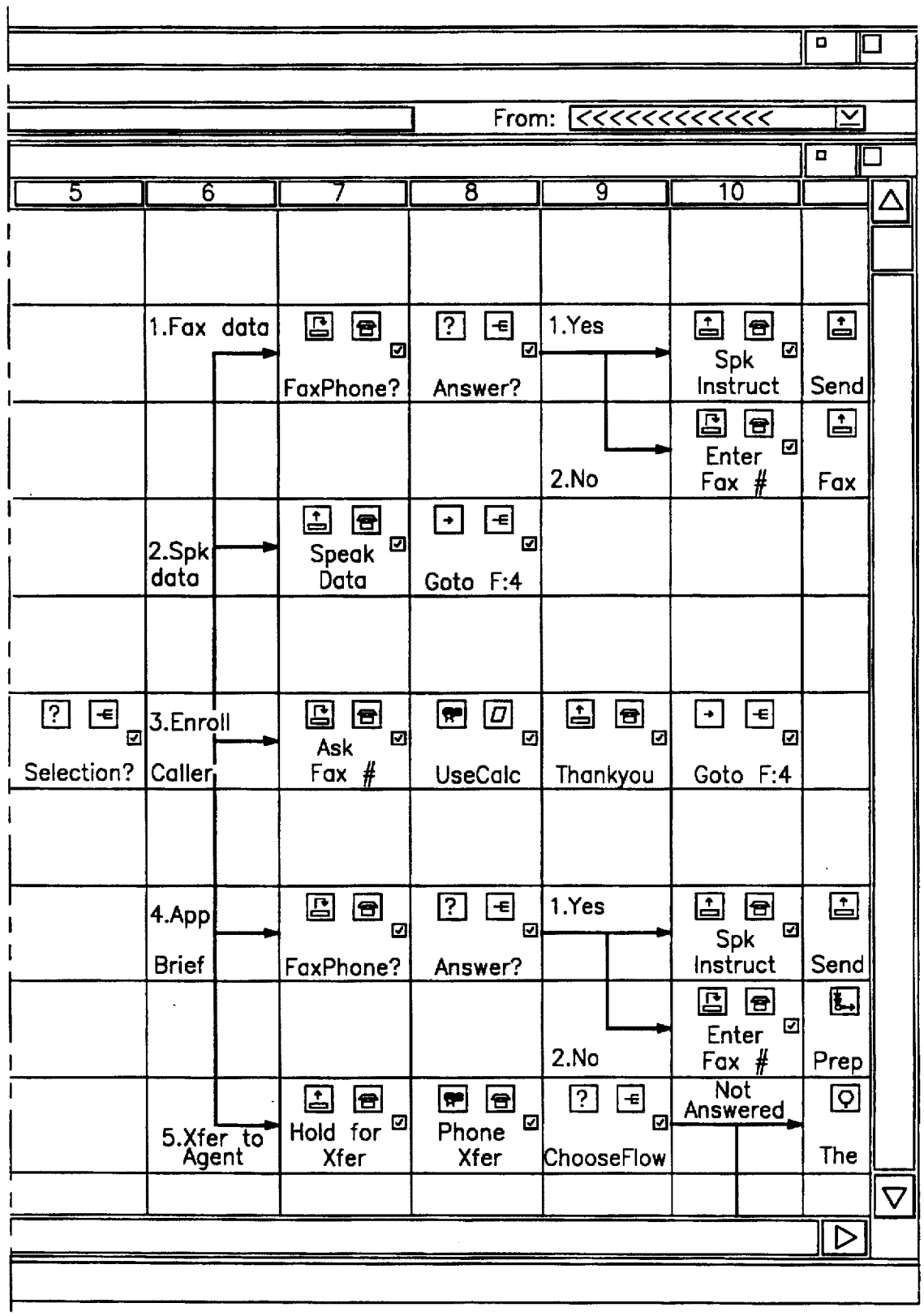
FIGS. 2a–2b are a composite display window for an electronic workforce indicating a screen programming process according to which an automated call processing sequence is defined to respond automatically to a user telephone call and to identify a live agent according to the present invention.
Figures 1, 2B:
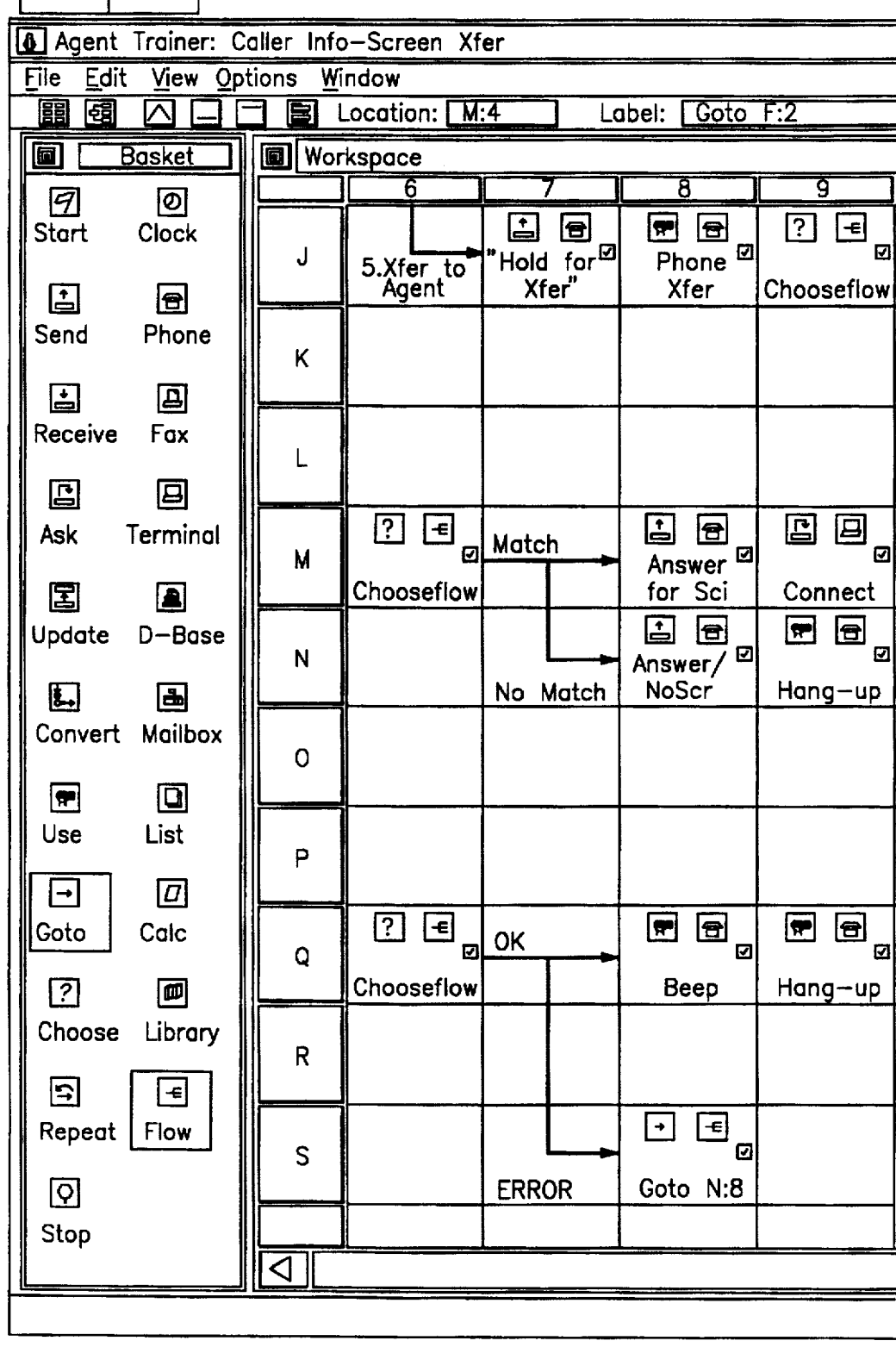
Figures 2, 2B:
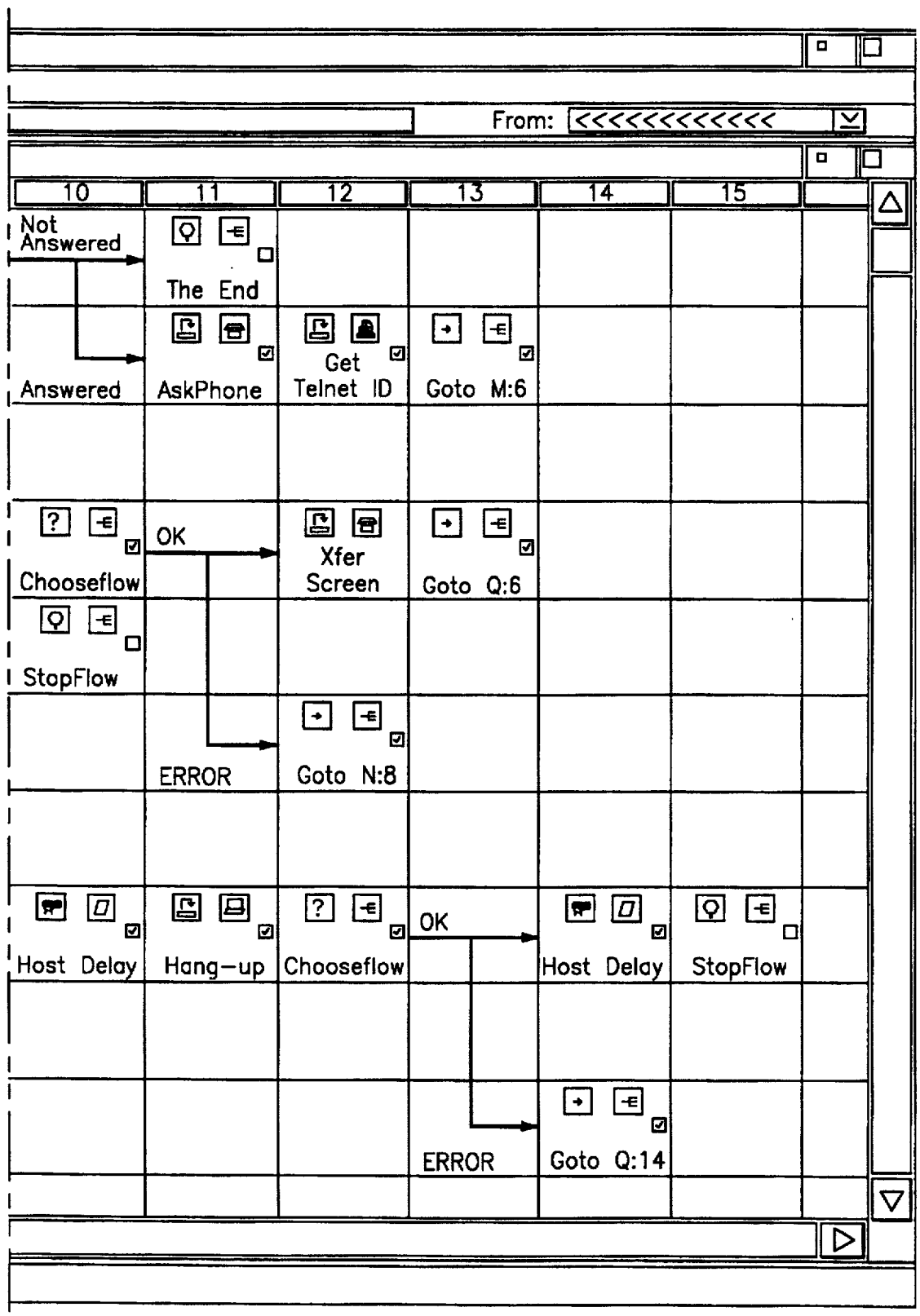

FIG. 1 a is a block diagram of a computer telephony integration system according to the present invention. The system of the present invention includes a first telephone 3 used by a caller interested in ascertaining information in a data base and possibly making voice contact with a live agent to discuss information in the data base. The system further includes a switch 4 such as a private branch exchange (i.e., a PBX), a voice response unit (VRU) such as an electronic workforce made by Edify Corporation of Santa Clara, Calif.

The computer telephony integration system according to the present invention shown in FIG. 1 a additionally includes a bus 6 interconnecting attached elements in a network, a computer 7 having a database, which may be a mainframe, a minicomputer, or a personal computer (PC). The system further includes a live agent system 8 including a live agent 8a, a personal computer (PC) 8b, and a second telephone 8c used by live agent 8a to communicate with switch 4. First telephone 3 is a conventional telephone employed by a user to initiate a user call. First telephone is connected to the central telephone network at a telephone switch 4. Telephone switch 4 is in turn connected to VRU 5, and second telephone 8c. Further, VRU 5, and second telephone 8c are each connected to bus 6 which in turn is connected to computer 7. VRU 5 is programmed according to the present invention to make an automated response to telephone calls received from switch 4, as discussed in detail below in connection with FIGS. 3a–3d. Particular details about electronic workforce 5 are provided in U.S. Pat. No. 5,455,903, which issued on Oct. 3, 1995, and having the title "Object Oriented Customer Information Exchange System and Method" which is hereby expressly referenced and incorporated herein by reference.

Figure 1A:
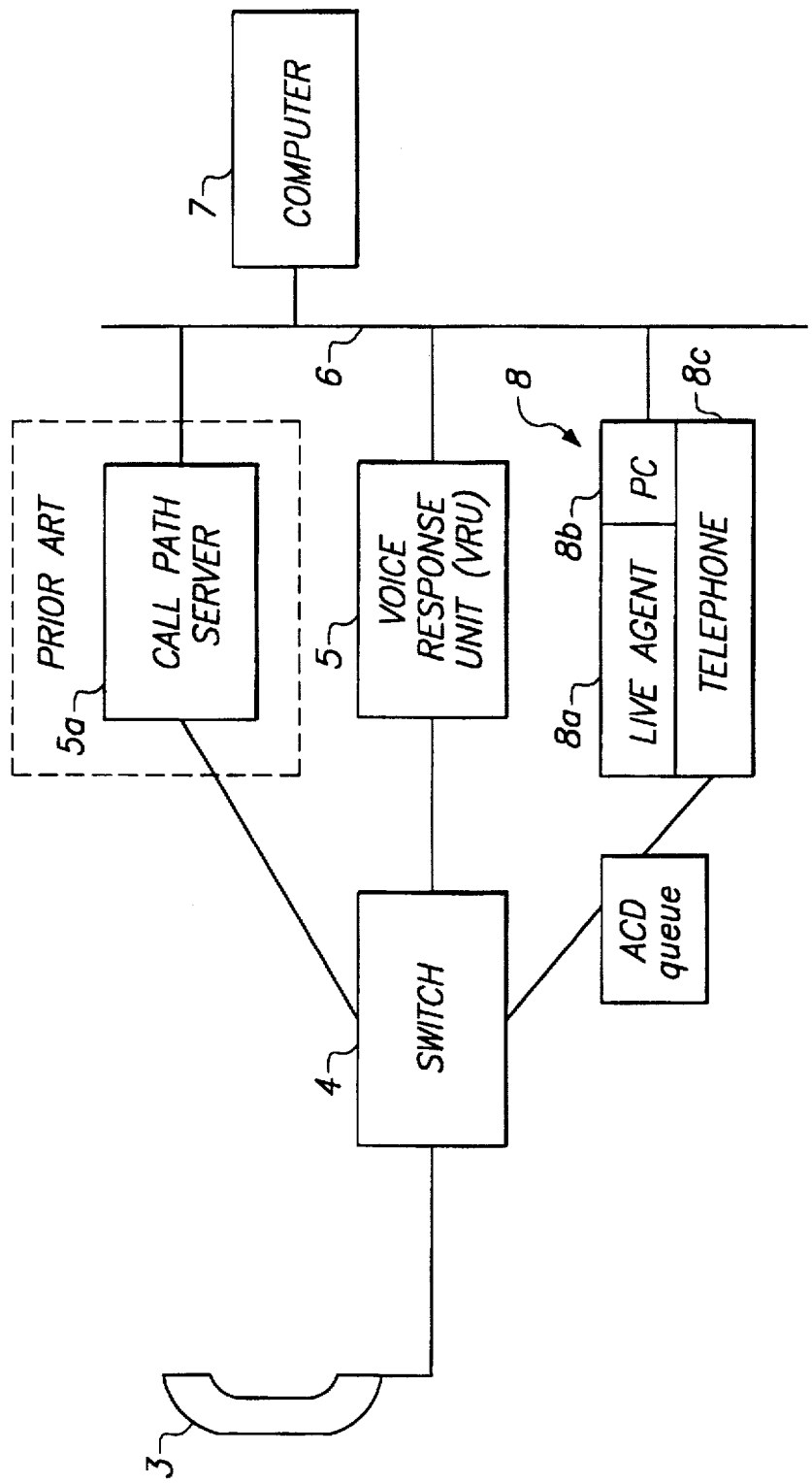
FIG. 1a is a block diagram of a computer telephone system according to the present invention and showing a call path server according to the prior art which is made unnecessary by the present invention.

Call path server 5a shown in FIG. 1a is used in the prior art to maintain synchronization of a live agent, a caller; and data relating to the caller. An example of the prior art includes U.S. Pat. No. 4,942,602, issued to William T. Baker, Jr., Charles M. Buffum, Charles H. Jolissaint, and Gregg W. Kerlin, under the title "Coordinated Transfer of Voice and Information Through a Network of Digital Switches." Another example of the prior art includes U.S. Pat. No. 4,805,209, issued to William T. Baker, Jr., Charles M. Buffum, Charles H. Jolissaint, and Gregg W. Kerlin, under the title "Coordinated Transfer of Voice and Information Through a Digital Switch." Such prior art examples are expensive and complicated.

Network bus 6 in FIG. 1a is a parallel set of electric wires carrying byte wide data signals and control or information signals between network elements including call path server 5a, VRU 5, personal computer 8b, and computer 7. The network bus can be a Telnet connection, for example. Computer 7 is a general purpose computer having memory for storing a data base as well as other well known computer features. Live agent 8a is a human person acting as a telephone operator or service individual. Switch 4 is connected to second telephone 8c through an automatic call distribution (ACD) queue. Personal computer 8a is a general purpose computer having a x86 architecture, for example. Personal computer 8a is connected through network bus 6 to computer 7 to receive caller information on a desk-top pop-up screen offering a visual depiction of selected data stored in computer 7. Second telephone 8c is a consumer telephone device, for example, connected to switch 4 through an ACD queue.

Figure 1B:
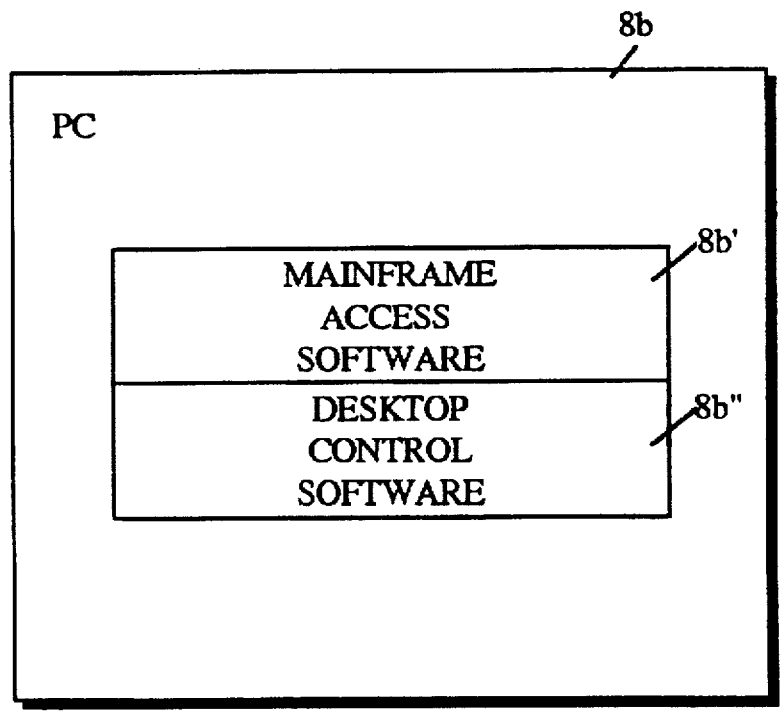
FIG. 1b is a block diagram of a live agent personal computer (PC) including mainframe access software and associated desktop control software.

FIG. 1b is a block diagram of a live agent personal computer (PC) 8b including mainframe access software 8b' and associated desktop control software 8b", each of which is loaded onto internal PC memory for operation. Mainframe access software 8b' is well-known software conventionally used to permit PC access to mainframe data or functions. According to one embodiment of the present invention, control software 8b" packages network signals to appear as keystrokes to mainframe access software 8b', thereby permitting VRU 5 to control PC 8b operations directly rather than operation requiring keystroke control by live agent 8a. Alternatively, well-known Microsoft Dynamic Data Exchange software is commercially available to accomplish this function of directly interfacing to VRU 5.

Figure 1C:
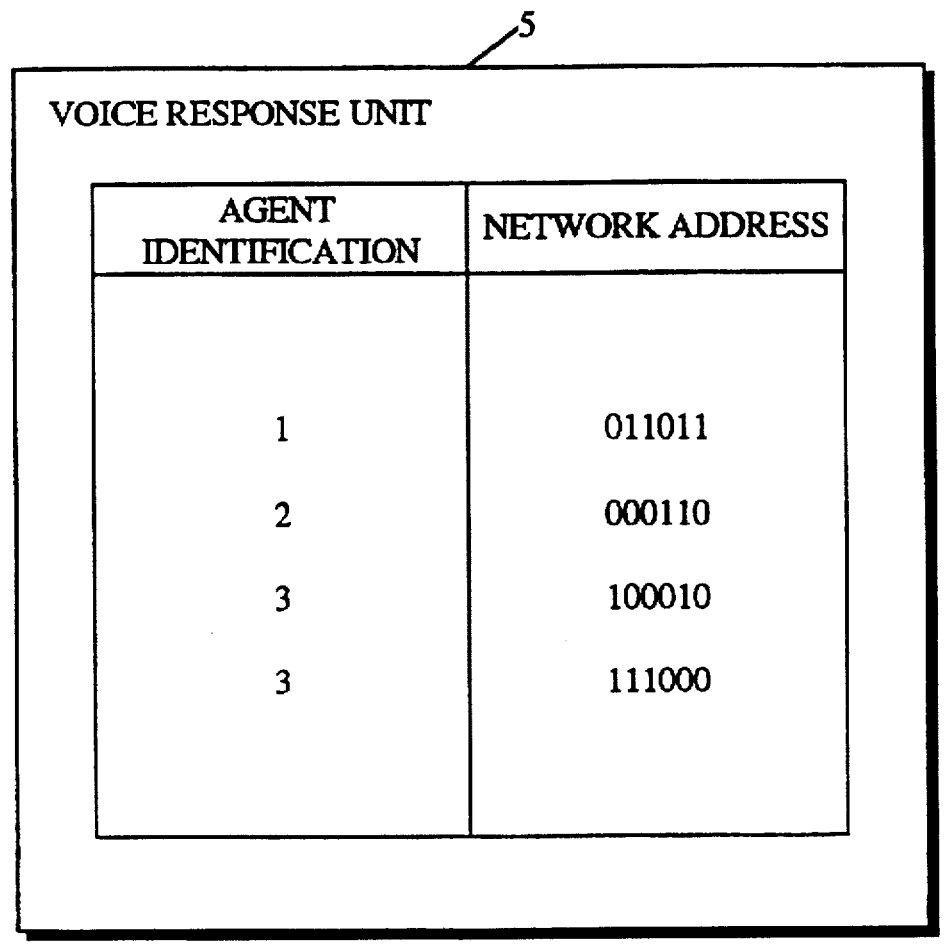
FIG. 1c is a block diagram of the voice response unit according to the present invention including a look-up table establishing the relationship between live agent identification codes and corresponding network addresses for the personal computers associated with the corresponding live agents.

FIG. 1c is a block diagram of voice response unit 5 according to the present invention including a look-up table establishing the relationship between live agent identification codes and corresponding network addresses for the personal computers 8b associated with the corresponding live agents 8a. Accordingly, when a particular live agent 8a is associated with a particular call, information produced in a data base about the particular caller can be network funneled to the personal computer 8b corresponding to the live agent 8a. Relevant data can then be caused to pop up on the screen of the live agent during a voice conversation established with the caller.

FIGS. 2a–2b are a composite display window 20 for electronic workforce 5 indicating a screen programming process according to which an automated call processing sequence is defined to respond automatically to a user telephone call. Display window 20 includes a menu 21 of action and device icons in respective first and second columns. As described in the above-referenced, incorporated patent application showing the electronic workforce 5, by selecting an action and device icon for placement at a grid position in display window 20, an object is established in a predetermined time sequence to cooperate with other linearly positioned objects, to perform automated call processing sequences. According to an embodiment of the present invention, a call is answered at grid position F1. Next, the electronic workforce 5 gets the customer number of the caller at grid position F2. Then, the electronic workforce 5 gets caller data at switch position F3. Next, the electronic workforce 5 enters a menu of alternatives. Depending on the alternative selected, a decision selection is made according to grid position F5. The grid positions with respect to faxing of data at B6 et seq. are not within the scope of the present invention and will not be discussed herein. Similarly, the grid positions with respect to faxing of data at D6 et seq. are not within the scope of the present invention and will not be discussed herein. Similarly, the grid positions with respect to faxing of data at F6 et seq. are not within the scope of the present invention and will not be discussed herein. Similarly, the grid positions with respect to faxing of data at H6 et seq. are not within the scope of the present invention and will not be discussed herein. The grid positions at cell J6 and thereafter are of interest with respect to the present invention. In particular, at cell grid position J7, the customer is temporarily placed on hold, to enable identification of a live agent for the customer. The phone transfer is made according to block J8, and two options for further processing are presented.

Operation continues with FIG. 2b, which provides at gird cell K11 that the telephone will be answered by an agent and, at grid cell K12, the agent's Telnet ID will be determined. Next, operation is transferred from K13 to M6. Operation then continues at grid cell M8 with the phone being answered. This is followed by terminal connection, and screen transfer, as well as operational transfer to grid cell Q8, where a beep is produced when screen transfer has been completed and a live agent is on line. Then, at grid cell Q9, the electronic work force hangs up.

Figure 3A:
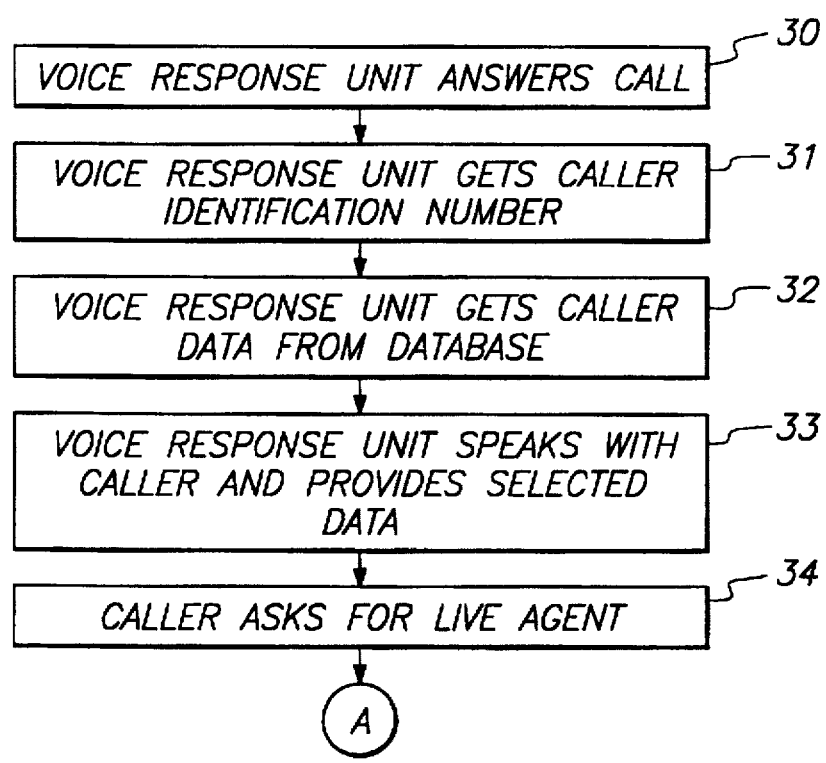
FIGS. 3a–3d show a method of call processing according to the present invention.

FIG. 3a shows operation of the computer telephony integration system according to one embodiment of the present invention. In particular, when a caller or customer using telephone 3 calls through switch 4 connected to VRU 5, the VRU answers the call electronically 30. VRU 5 detects the caller's voice and electronically asks for the caller to provide identification information such an identification (ID) number. When the caller provides the ID# or the like, VRU 5 gets 31 the caller ID#. Next, VRU 5 uses the ID# to access database information on computer 7 about the caller, and gets 32 particular caller data which is of interest or utility with respect to the caller, from the database in computer 7. The particular caller data may for example indicate something about the relationship between the holder or operator of VRU 5 and the caller, such as account or financial information, for example. As a consequence of having received the information, VRU 5 accordingly speaks 33 with the caller and provides selected information which has been acquired from computer 7. VRU 5 may play a menu of options or alternatives to the caller, after the information has been provided, including a choice as to whether the caller wishes to speak with a live person, i.e., live agent. This is possible, when the caller is surprised, for example, about the information received. For example, the caller may find there is a zero balance in an account. Accordingly, caller asks 34 for a live agent.

Figure 3B:
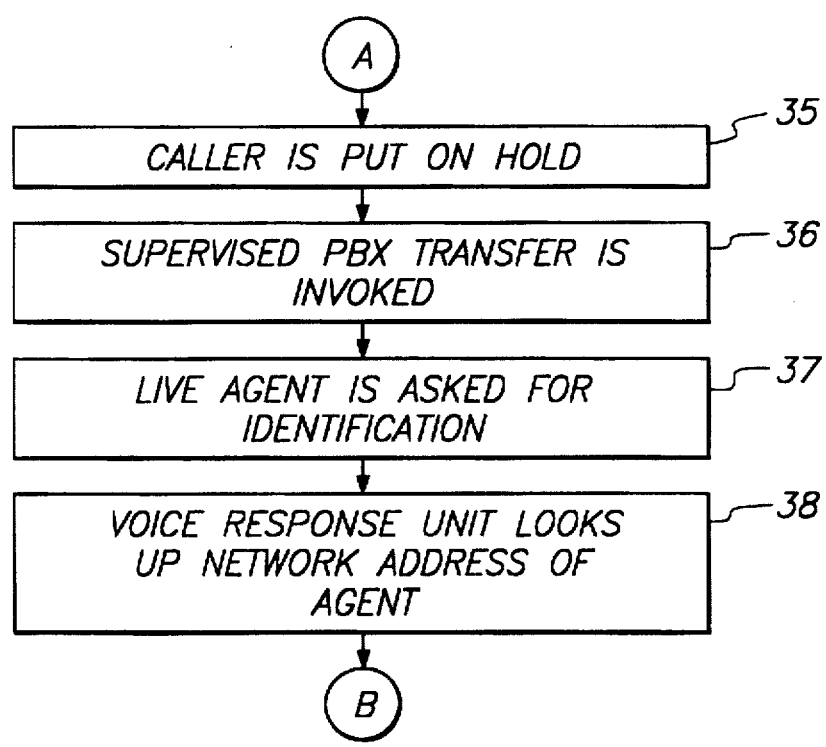

The method according to the present invention continues at FIG. 3b, with the caller being placed on hold 35 temporarily, with VRU 5 exercising one of the station features of a PBX. While on hold, switch 4 may have the caller connected to music for the interim. Further, a supervised PBX transfer is invoked 36. Next, the live agent is asked 37 for identification by VRU 5 operating through switch 4, which is provided either directly by the voice of the live agent, or by a DTMF signal either automatically provided or given by the human intervention of the particular live agent. VRU 5 then looks up 38 the network address of the live agent at a memory location in VRU 5, including a look-up table for example which relates specific live agent ID#'s with the network addresses of the corresponding live agents.

Figure 3C:
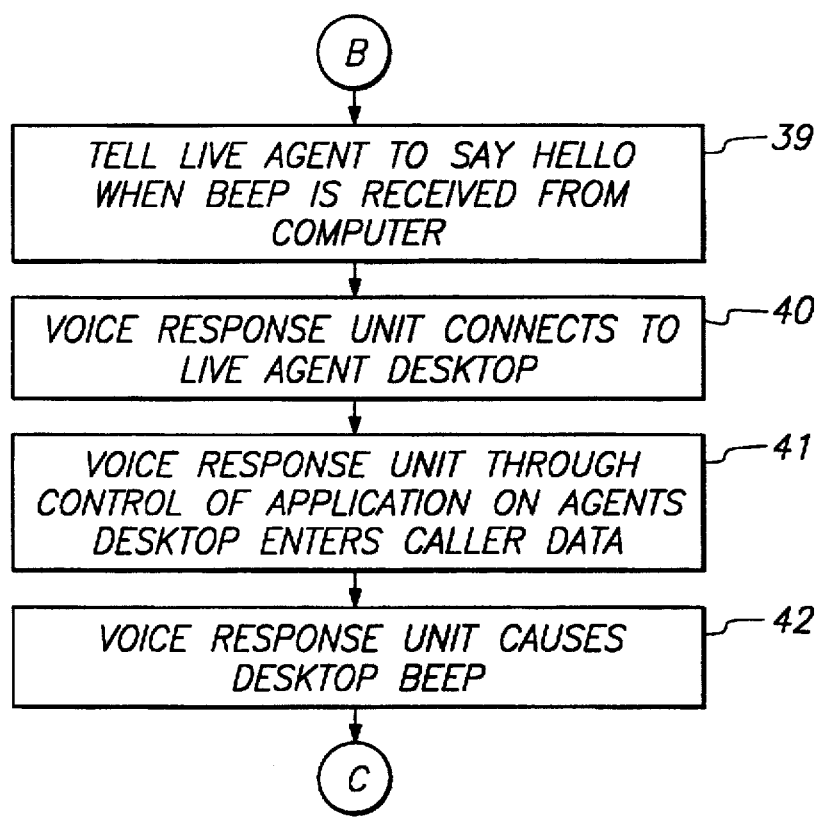

The method according to the present invention continues at FIG. 3c VRU 5 telling 39 live agent 8b to say "hello" when the live agent receives a signal, e.g., "beep," from PC 8b indicating receipt of caller information corresponding to a caller on hold. VRU 5 next connects 40 to live agent 8a's desktop PC 8b through network bus 6. Then, VRU 5 provides data 41 on the specific caller on line, through control of the application on live agent 8a's desktop. Next, VRU 5 causes 42 live agent 8a's desk-top to "beep."

Figure 3D:
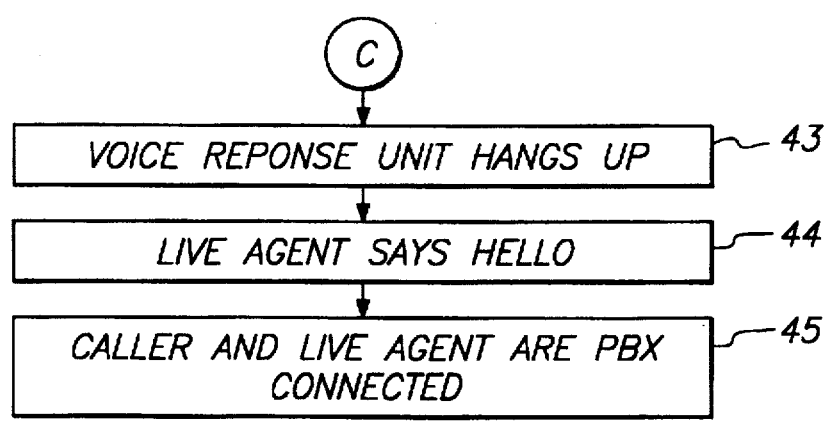

The method according to the present invention continues at FIG. 3d, with VRU 5 hanging up 43 with respect to the caller, permitting VRU 5 freedom to handle other user calls electronically. Thereafter, or contemporaneously with the beep sound, live agent 8a is connected by voice to the caller, and says "hello" 44 to let the caller know that live agent 8a is on line. Thus, the caller and live agent 8a are PBX connected 45. Any questions about the information originally expressed electronically through VRU 5 are thus addressed person to person over voice communications.

What is claimed is:

1. A method of connecting a caller to a live agent in an automatic call distribution queue connected to a private branch exchange in turn connected to a voice response unit which is connected to a network having a computer storing a caller information database, comprising:

receiving a call from the caller through a private branch exchange, electronically asking the caller for caller identification, using the caller identification information to retrieve caller data, transmitting at least a portion of the retrieved caller data to the caller, offering the caller a menu of response alternatives including the choice of speaking with one of a number of live agents, receiving a request for a live agent, connecting with a live agent, asking the live agent for identification, using the identification to identify a computer associated with the live agent which has been identified, providing a signal to the live agent indicating receipt of the data, providing the data associated with the caller to the live agent selected for live agent communication and providing a signal to the live agent indicating to the live agent to begin speaking to the caller.

2. A system for providing automated call response and live agent communication, comprising:

a switch connected to a caller telephone, a voice response unit coupled to said switch and a network having a computer storing caller information, said voice response unit communicating with a caller to receive a caller identification and retrieving the caller information corresponding to the caller identification, and a live agent desktop including a live agent telephone and a live agent personal computer, said live agent telephone coupled to said switch, and said live agent personal computer coupled to the voice response unit, said live agent desktop receiving a first signal indicating to the live agent that the caller information has been received, receiving the caller information retrieved by the voice response unit, and receiving a second signal indicating to a live agent to begin speaking to the caller.

* * * * *